UNITED STATES PATENT OFFICE.

HARMAN HIBBARD, OF DARIEN, NEW YORK.

COMPOSITION OF PAINTS.

Specification of Letters Patent No. 27, dated September 20, 1836.

*To all whom it may concern:*

Be it known that I, HARMAN HIBBARD, of Darien, in the county of Genesee and State of New York, have invented a new and useful Improvement in the Art of Manufacturing Paints; and I do hereby declare that the following is a full and exact description.

The nature of my invention consists in using—1st flowers of sulfur, sulfuric acid, and carbonate of lead in forming Prussian-blue. 2d in using nitric acid, and carbonate of lead to form chrome yellow. 3d in the further use of flowers of sulfur to form chrome green, 4th in the formation of a metallic green from sulfate of copper, and carbonate of lead.

To enable others skilled in the art to make and use my invention, I will proceed to describe the process by which these paints may be prepared.

To make Prussian blue, dissolve 16 lbs. sulfate of iron in as small a quantity of boiling water as possible, dissolve 1 lb. of prussiate of potash in 1 pint of boiling water after being finely pulverized, and add to the sulfate of iron, add 1 lb. of carbonate of lead and ½ lb. of flowers of sulfur previouly ground together in water, then add sulfuric acid till effervescence ceases, the sediment should be left with an excess, of acid possessing a sour taste, the whole should be thoroughly blended together, and then left to dry.

To make chrome yellow, to 16 lbs. carbonate of lead finely ground in water, and put into a tub containing 16 gallons of boiling water add 1 lb. chromate of potash (previously dissolved in 3 gallons of boiling water) to the solution of potash add 8, oz. nitric acid, and add this mixture to the tub containing the carbonate of lead, taking care to keep up agitation for some minutes then leave, and the lead will fall, decant the water, and dry the sediment.

To make chrome-green, to 1, lb. Prussian blue add 2, lbs. of chrome yellow, and 1 lb. flowers of sulfur, the whole should be moistened with water and finely pulverized together, a sufficient quantity of sulfuric acid should be added to leave a sour taste if the effervescence ceases, the sediment should then be dried without washing.

To form a metallic green, dissolve 1, lb. sulfate of copper in 3 gallons of boiling water, and add 1, lb. carbonate of lead, previously pulverized in 1, pint of hot water, then put into 3 gallons of boiling water, pour the solution lead into the solution of copper slowly, and at the same time keep up a constant agitation, it may then be left to subside, pour off the water, and dry the sediment.

What I claim as my invention, and desire to secure by Letters Patent is—

1. The using of flowers of sulfur, sulfuric acid, and carbonate of lead in forming Prussian blue as the flowers of sulphur contains a slight degree of acid which is not easily extracted by coming in contact with an alkaline substance, I use it to support the blue—I use sulfuric acid to assist in saturating the composition with oxygen which forms the blue,—I use the carbonate of lead to precipitate the iron, to discharge the superfluous acid, and to assist in forming a body to the paint.

2. In the use of nitric acid, and carbonate of lead in preparing chrome yellow, the acid discharges the carbon contained in the lead and causes the chromate, and lead to unite.

3. In the further use of the flowers of sulfur in preparing chrome green, the sulfur prevents the green from discharging the blue when exposed to the atmosphere, the formation of a metallic green—from sulfate of copper, and carbonate of lead.

HARMAN HIBBARD.

Witnesses:
BARNEY E. SEAVER,
ISAIAH RANO.